Dec. 5, 1950          C. E. JOHNSON          2,532,314
POTATO HARVESTING MACHINE
Filed April 20, 1944                          7 Sheets-Sheet 1
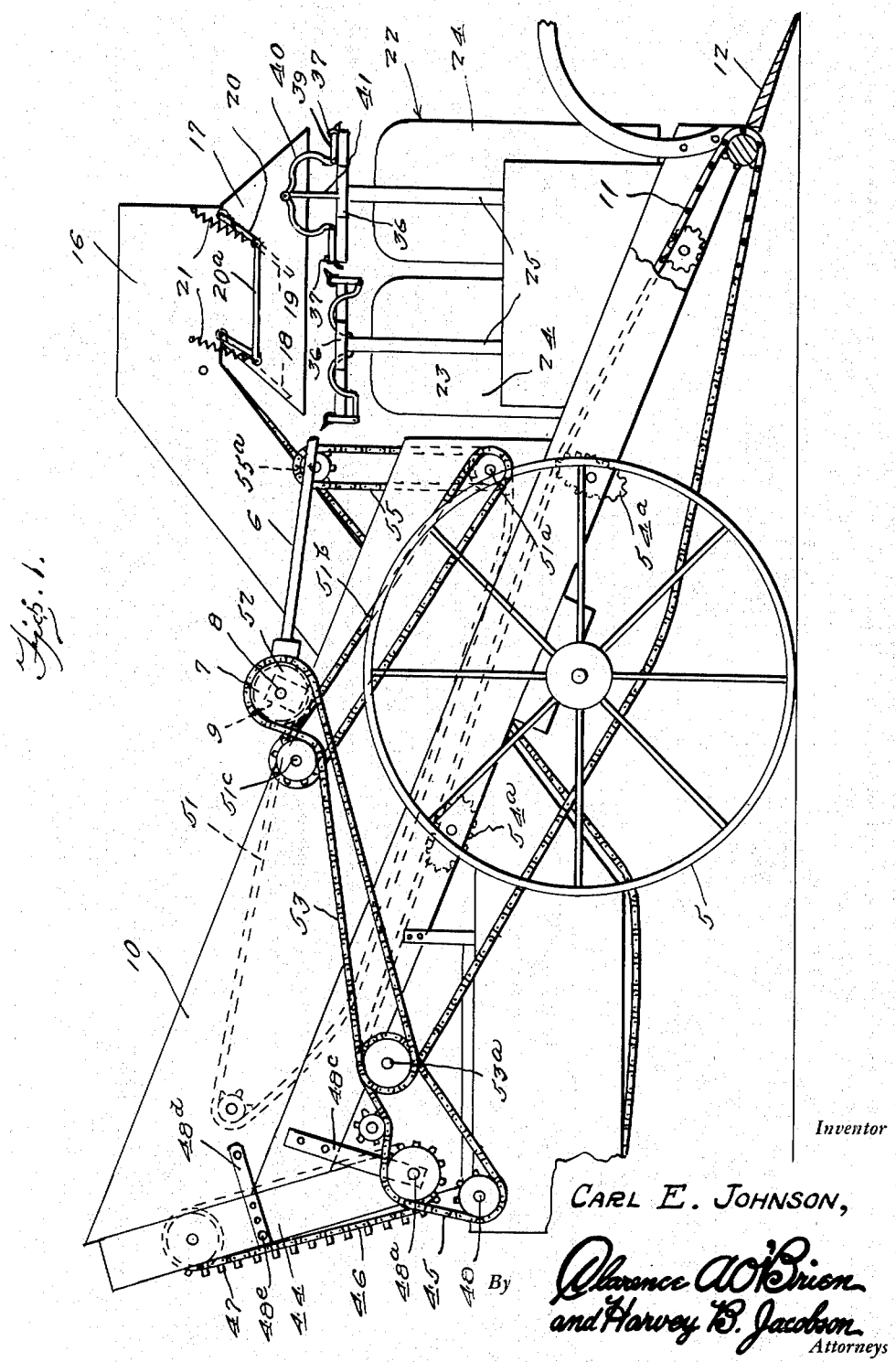
Inventor
CARL E. JOHNSON,
By *Clarence A. O'Brien*
and *Harvey B. Jacobson*
Attorneys

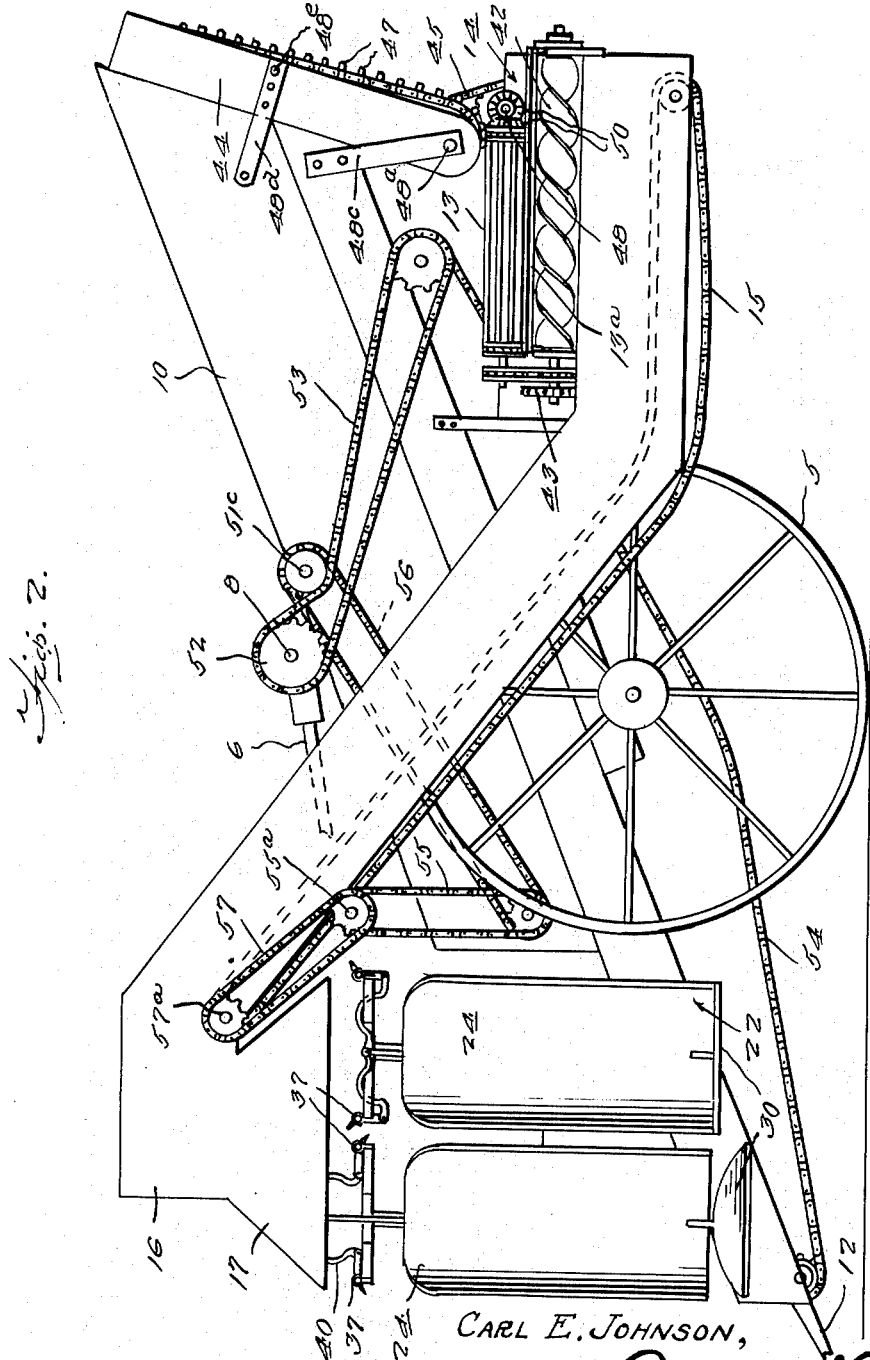

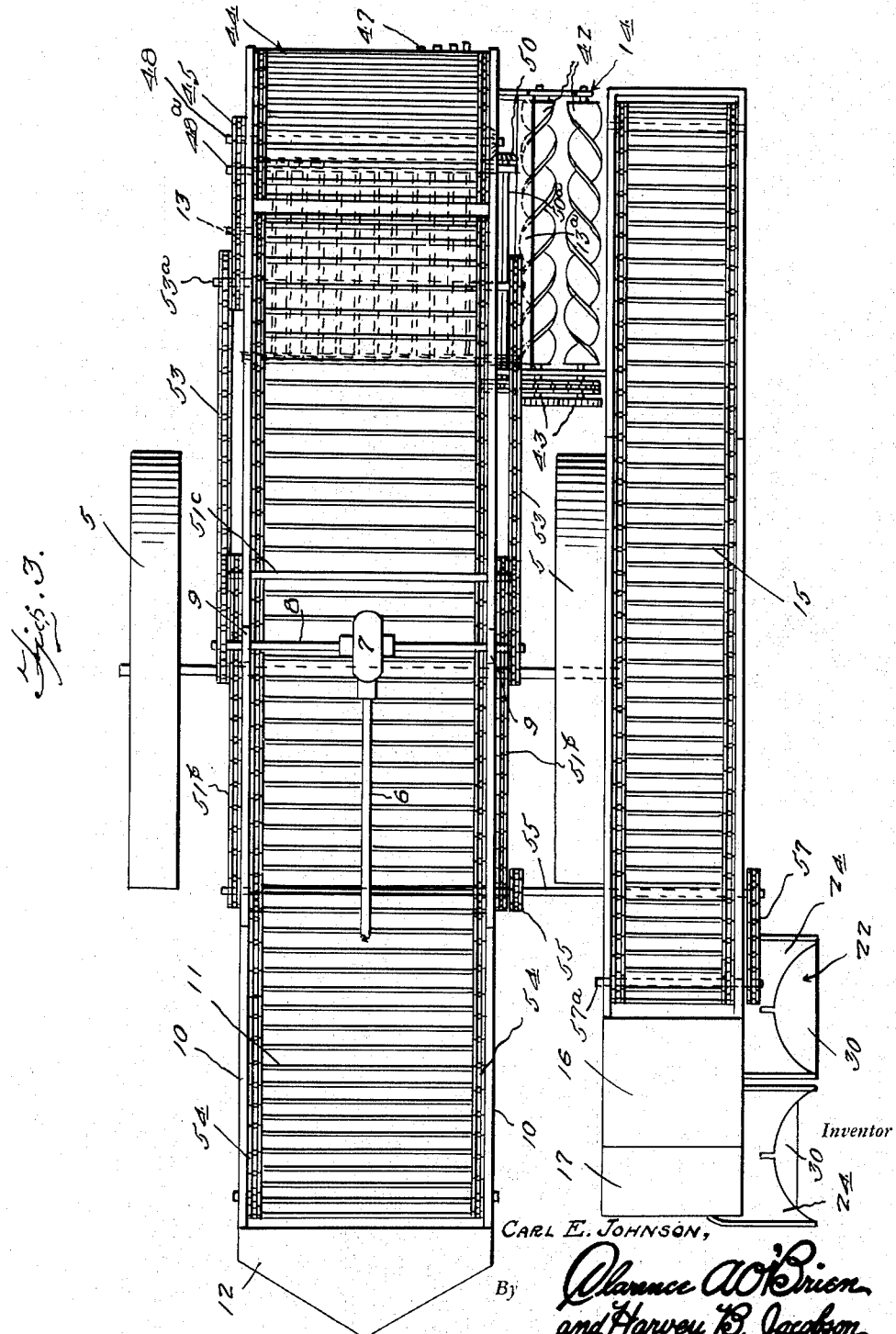

Dec. 5, 1950     C. E. JOHNSON     2,532,314
POTATO HARVESTING MACHINE
Filed April 20, 1944     7 Sheets-Sheet 4
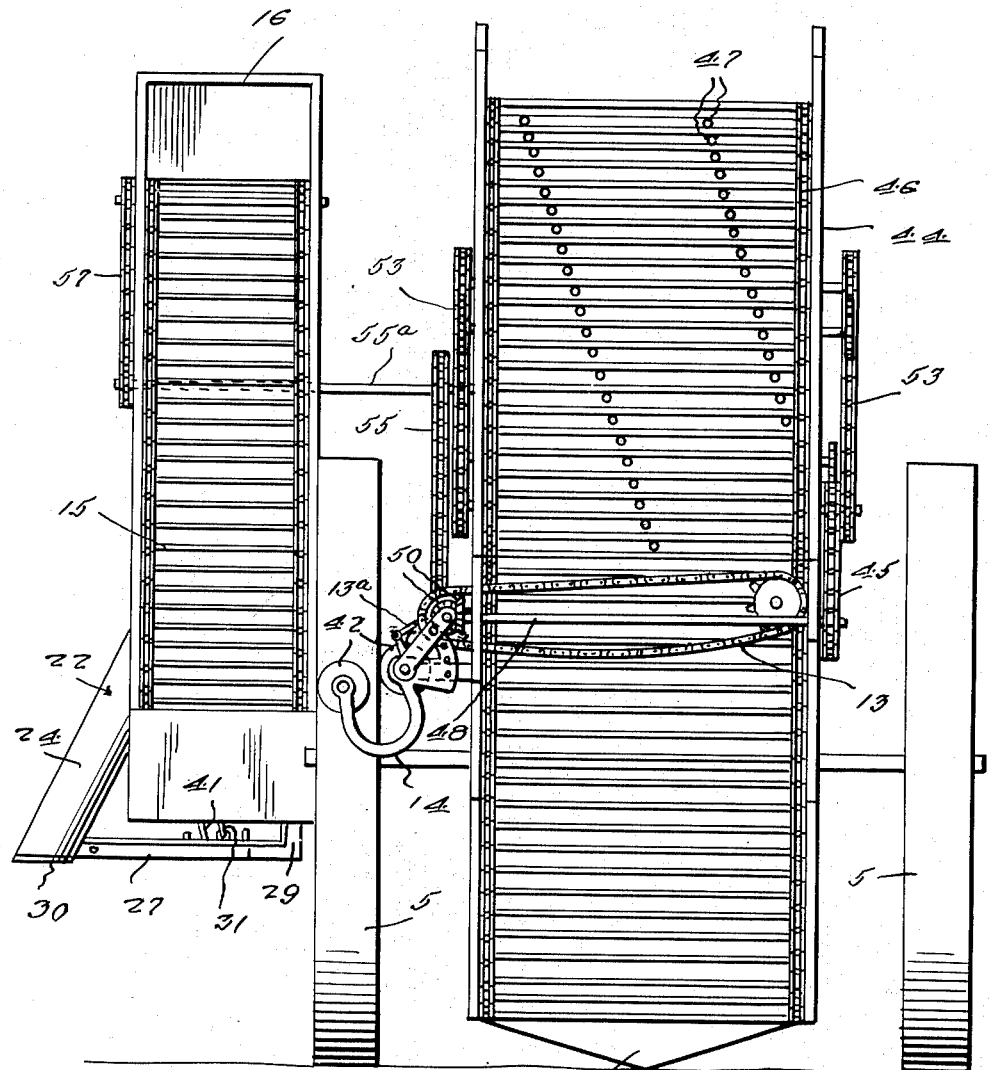
Inventor
CARL E. JOHNSON,
By Clarence A. O'Brien
and Harvey B. Jacobson
Attorneys Dec. 5, 1950   C. E. JOHNSON   2,532,314
POTATO HARVESTING MACHINE
Filed April 20, 1944   7 Sheets-Sheet 5
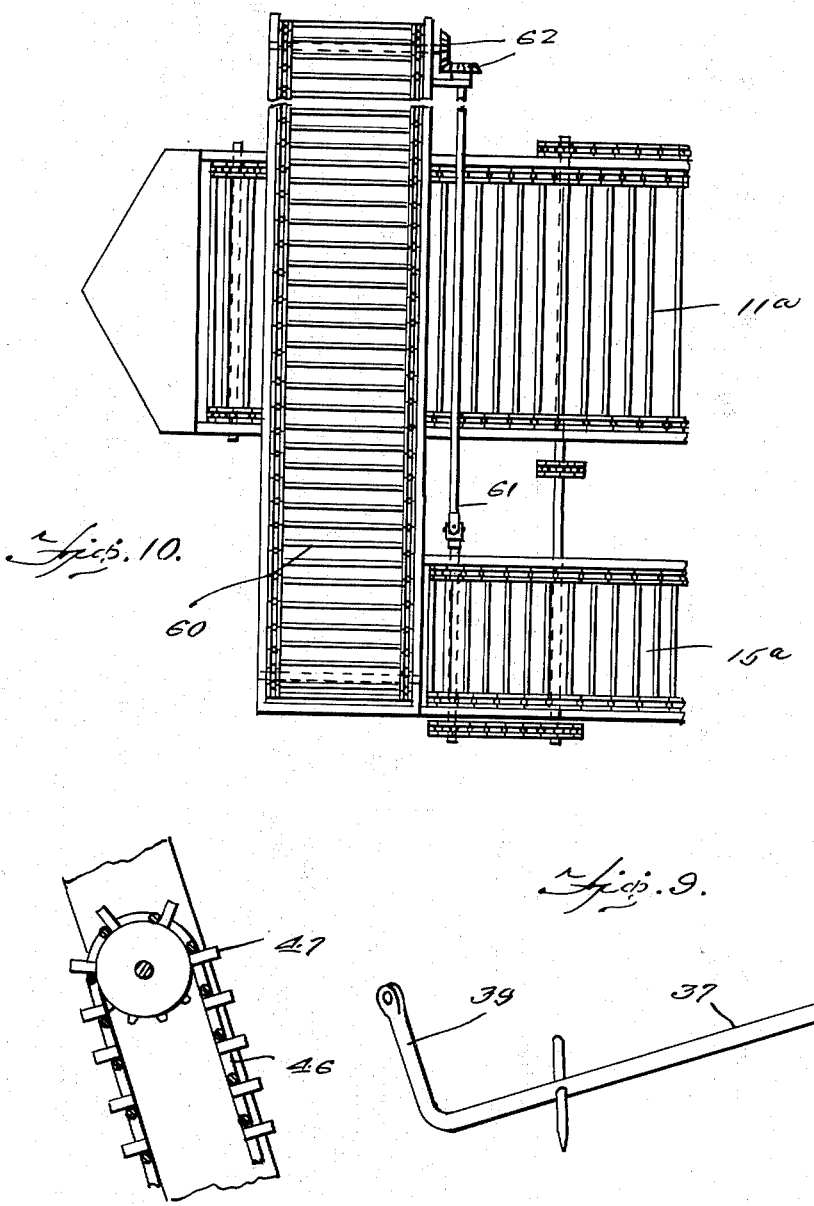
Inventor
CARL E. JOHNSON,
By Clarence A. O'Brien
and Harvey B. Jacobson
Attorneys Dec. 5, 1950  C. E. JOHNSON  2,532,314
POTATO HARVESTING MACHINE
Filed April 20, 1944  7 Sheets-Sheet 6
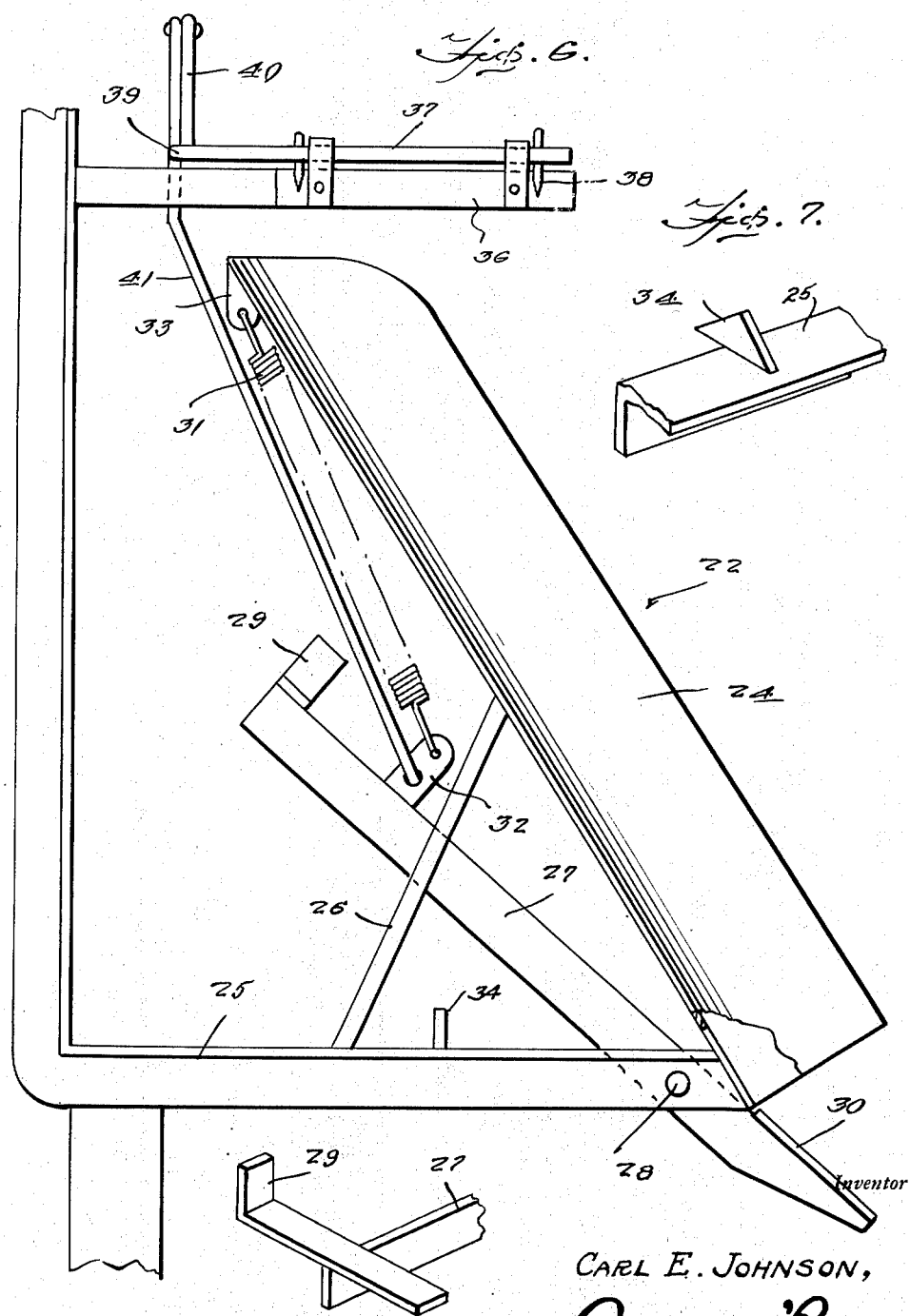
Inventor
CARL E. JOHNSON,
By Clarence A. O'Brien
and Harvey B. Jacobson
Attorneys

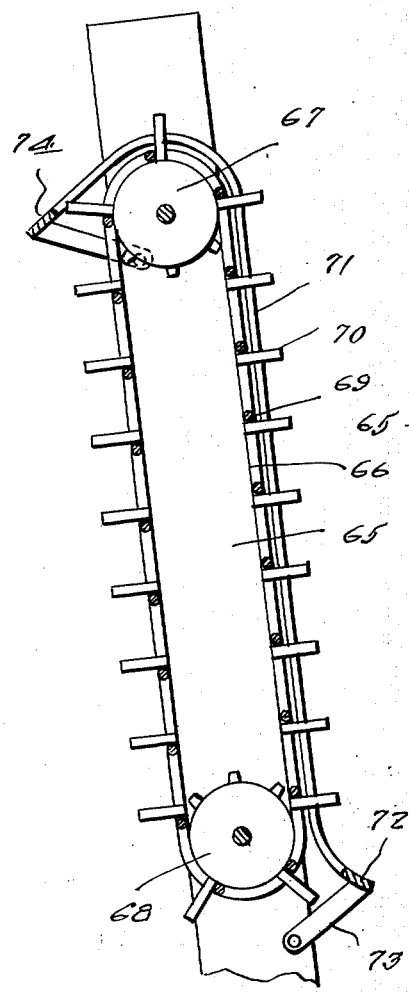
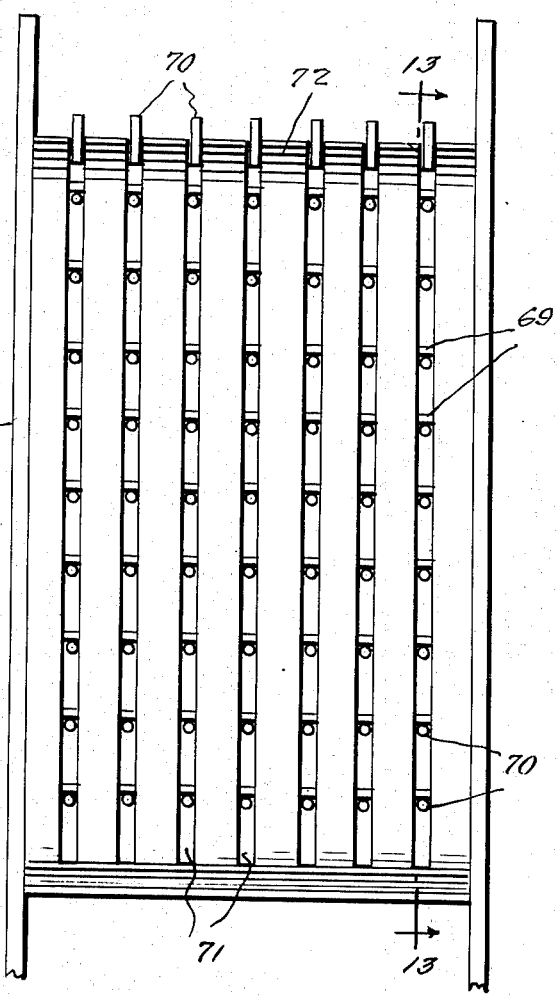
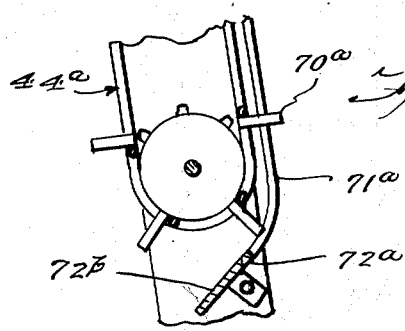

Patented Dec. 5, 1950

2,532,314

UNITED STATES PATENT OFFICE 2,532,314

POTATO HARVESTING MACHINE

Carl E. Johnson, Idaho Falls, Idaho

Application April 20, 1944, Serial No. 531,909

5 Claims. (Cl. 55—51)

This invention relates to new and useful improvements in potato harvesters, the principal object being to provide a potato harvesting machine which will not only dig potatoes, but also separate the potatoes from soil, stones and vines and subsequently bag the potatoes, or place them in a wagon or truck direct, all in as substantially automatic series of operations.

Another important object of the invention is to provide a machine of the character stated which is positive acting and substantially foolproof in all of its operations.

Other objects and advantages of the invention will become apparent to the reader of the following description.

In the drawings:

Figure 1 represents a fragmentary side elevation of the machine, with the front portion in section.

Figure 2 is a side elevation looking at the opposite side from that shown in Figure 1.

Figure 3 is a top plan view.

Figure 4 is a rear elevation.

Figure 5 is a fragmentary vertical sectional view through the vine remover.

Figure 6 is a fragmentary side elevational view of one of the baggers.

Figure 7 is a fragmentary perspective view showing one of the keepers for the bagging mechanism shown in Figure 6.

Figure 8 is a fragmentary perspective view showing one of the foot treadles for one of the bagging mechanisms.

Figure 9 is a perspective view of one of the bag equipping rods.

Figure 10 is a top plan view of a slightly modified form, disclosing the machine without the bagging mechanism and with a transverse conveyor.

Figure 11 is a fragmentary edge elevational view of the crusher.

Figure 12 is a fragmentary inside elevational view showing a modification of the vine remover.

Figure 13 is a fragmentary vertical sectional view taken on the line 13—13 of Figure 12.

Figure 14 is a fragmentary sectional view showing a modification of the vine remover shield.

Referring to the drawings wherein like numerals designate like parts, it can be seen that the machine is supported by wheels 5 and is preferably pulled by a tractor (not shown) which operates a drive shaft 6 to a gear box 7 and, in turn, delivers the power to a shaft 8 journaled through bearings 9 located on the side walls 10 of an inclined elevator 11. At the lower end of the elevator 11 is a blade or plow 12 for digging potatoes. Potatoes are elevated by the elevator 11 and when they reach the upper end thereof fall off onto a transverse conveyor 13 from where they are delivered over a separator generally referred to by numeral 14 and fall onto the lower end of an elevator 15, where they are lifted to an overhead structure 16 having a flared apron 17 in which deflector panels 18, 19 are swingably mounted, each panel having an external arm 20 depending as shown in Figure 1 and linked together by a rod 20a to act in unison. Springs 21 serve to hold these panels in one position or the other for delivering potatoes either to one or the other of two bagging mechanisms 22, 23.

Each bagging mechanism is constructed as shown in Figure 6, the same consisting of an inclined bag supporting tray 24, open at its bottom and being mounted within an L-shaped frame 25. The tray 24 is supported in a definite inclined position by a brace 26. A treadle 27 rockably supported as at 28 has a foot-engageable pedal or the like 29 at its inner end and a plate 30 at its opposite end which when disposed against the open bottom of the tray 24 serves as a support for a bag lying against the tray. A spring 31 is interposed between a lug 32 on the treadle 27 and a lug 33 on the upper portion of the tray 24 so as to automatically pull the treadle to the position shown in Figure 6 when the treadle is released from its detent means, so that a filled bag can slide out of the tray due to the displacement of the bottom plate 30. The treadle 27 is sufficiently flexible so that it can be brought down and under a projecting keeper 34 on the lower portion of the frame 25.

As shown in Figures 1 and 6, each of the bagging devices has a yoke 36 projecting inwardly from its corresponding frame 25 and on each yoke 36 is a pair of shafts 37. Each of the shafts 37 has several spurs or pins 38 adapted to engage and hold the open end of a bag.

From one end of each of the shafts 37 projects an arm 39 and these arms are connected by arcuate-shaped link members 40 to the upper end of a connecting rod 41, which extends down and connects to the aforementioned lug 32.

Obviously, when the treadle 27 is released from a position where the plate 30 has been supporting a bag on the tray 24, the treadle 27 will be pulled upwardly by the spring 31 at the same time an upward movement takes place by the rod 41, this movement resulting in the turning of the shaft 37 and the moving of the pins 38 to a position releasing the filled bag.

A feature for the removal of stones and other heavy objects before the potatoes reach the elevator 15 is shown in Figures 3, 4 and 2. This assembly is denoted by reference character 14 and consists of a pair of spirals 42, 42 driven by gears 43. These spirals are slightly spaced and one spiral is slightly higher than the other. As the potatoes leave the conveyor 13, they being light have a tendency to hop or bounce over and out the spiral 42, but stones and other heavy objects have a tendency to settle on the spirals and are fed toward the rear ends thereof where they drop to the ground. Instead of the inner spiral 42 a larger smooth roll may be employed and this may afford a better surface for the potatoes to bound across.

Frequently stones will get caught in the bars of the transverse conveyor 13 and to alleviate this condition a spring supported apron 13a is provided at the discharge end of the conveyor 13 to dislodge the caught stones. Across this apron potatoes, stones, etc. can move.

At the back of the machine is a vertically disposed structure 44 operated by a chain 45. This is an endless conveyor 46, the traveling structure carrying a multiplicity of projections 47 which serve to engage and hold the potato vines, lifting the same out of the space between the structure 44 and the upper end of the conveyor 11 and dumping the same to the rear of the machine. (Modification shown in Figures 12 and 13.)

A shaft 48 driven by the chain 45 is geared at 50 to a shaft 50a which, in turn, is in driving connection with the separator 14. Above the shaft 48 is a shaft 48a, also driven by the chain 45. The shaft 48a is fulcrumed on the lower ends of brackets 48c. Thus the vine remover 44 is swingably supported and held in adjusted position by apertured arms 48d provided with suitable detents 48e.

An endless clod crusher 51 overlies the elevator 11, the lower flight of which moves against clods of earth on the elevator 11 to crush the same and to make this operation efficient, the crusher 51 is intended to move more rapidly than the elevator 11. The transverse bars of the endless crusher 51 are preferably stepped as at a, b and c (see Figure 11).

At the lower end of the crusher 51 is a shaft 51a having sprocket wheels over which sprocket chains 51b are disposed, these sprocket chains 51b being disposed over sprockets on a shaft 51c on which are additional sprockets engaging the chains 53. Thus, it can be seen that the chains 51b are driven reversely to the chains 53.

A chain 55 (see Figure 1) is operated by the shaft 51a, this driving a shaft 55a operating on a chain 57 to drive by way of a shaft 57a, the elevator 15. (See Figure 2.)

Obviously, the chains and sprockets may be differently arranged and, in fact, where practical, gears may be used in place of such operating connections.

It can now be seen, that potatoes are dug by the blade 12 and elevated by the elevator 11 and elevator 51 to a point where the potatoes drop off onto the transverse conveyor 13 while vines are picked up by the assembly 44 and dropped at the rear of the machine. The potatoes including rocks and other objects, go over the separator 14 where the rocks are caught by the screws 42 and delivered to the rear of the machine, while the potatoes alone go to the elevator 15 where they are elevated and subsequently delivered into bags on the bagging mechanisms 22, 23.

Figure 10 discloses a modification of the invention. In this view reference characters 11a and 15a denote the first and final elevators of the machine corresponding to the elevators 11 and 15 shown in Figure 3. The variance exists in the provision of a cross conveyor 60 for delivering potatoes from the conveyor 15a across the machine to a wagon (not shown) on the opposite side.

Obviously, bagging means similar to that disclosed in Figure 2, may be used at the discharge end of the cross conveyor 60. The conveyor 60 is driven by a shaft 61 and gear 62, the power being taken off of the elevator 15a (see Figure 10).

A modification of the vine remover is shown in Figures 12 and 13. Sometimes in the instance of the vine remover 44, vines will be caught by the projections 47 and carried around, thus preventing proper operation of this mechanism. It is, therefore, preferable that a shield be employed to insure the displacement of the vines from the removable mechanism. As can be seen in Figures 12 and 13, the modified vine remover consists of a pair of side walls 65, 65 between which an endless structure 66 operates in a vertical direction and is trained over sprockets 67, 68, the lower sprocket being driven as in the manner shown in Figure 1.

The endless structure 66 has cross bars 69 from which projections 70 project through longitudinal slots 71 in a shield 72. This shield can be of sheet metal and is disposed upwardly just inside of the endless structure 66 and the longitudinal slots are sufficiently wide to permit free movement of the projections 70 along the same.

The lower end of the shield is supported by suitable brackets 73 and is curved inwardly as suggested in Figure 13.

The upper end of the shield passes over the upper portion of the vine remover and slants backwardly as at 74 the slots 66 terminating inwardly of the edge of the portion 74.

The upper end portion 74 of the shield projects a substantial distance rearwardly of the upper end of the vine remover so that the projections 70 will have an opportunity to gradually recede through the slots in passing downwardly with the rear flight of the endless structure 66 and in this action of receding through the slots, the vines are released so that they can fall to the ground well rearwardly of the vine remover.

A further form of the invention is shown in Figure 14 where a shield 72a corresponding to the shield 72 of Figure 13 has its lower end curved outwardly as at 72b. This shield has slots 71a as in the shield 72 so as to accommodate fingers 70a of a vine remover generally referred to by numeral 44a and which otherwise is constructed in conformity with the vine remover 44 hereinbefore described. This outwardly disposed lower portion 72b may be found desirable under certain conditions and should it be necessary to use the vine remover in a different position of adjustment than that shown in the drawings.

Reverting to the apron 13a it is to be understood that this element serves not only as a surface over which potatoes and stones can move, but inasmuch as it is a flat inclined surface, the tendency will be to allow the stones to slide down the same to the separator 14 and definitely be caught thereby, while the action of the potatoes is to roll over the apron 13a and bound over the separator 14 to the elevator 15.

While the foregoing specification sets forth the invention in specific terms, it is to be understood Having described the invention, what is claimed as new is:

1. A potato harvester including a frame a digger carried by said frame, an elevator supported on said frame rearwardly adjacent to said digger, a second elevator supported on said frame disposed generally parallel to but oppositely inclined to said first elevator, a transverse conveyor carried by said frame extending from the discharge end of said first elevator and delivering to the lower end of said second elevator, a separator carried by said frame interposed between the conveyor and said second elevator and overlying the lower end of the latter, an endless vine removing unit pivotally and adjustably secured to said frame adjacent the upper end of the first elevator for removing vines before the elevator's contents are delivered to said conveyor, said separator including a rotatable helix between said conveyor and said second elevator, and means drivingly interconnecting said first elevator, said second elevator, said conveyor, said separator, and said vine removing unit.

2. A potato harvester including a frame a digger carried by said frame, an elevator supported on said frame rearwardly adjacent to said digger, a second elevator supported on said frame parallel to but inclined oppositely to said first elevator, a transverse conveyor carried by said frame adjacent ends of said elevators and transporting potatoes from the discharge end of said first elevator to the lower end of said second elevator, a stone removing unit supported on said frame interposed between said transverse conveyor and said second elevator and overlying the lower end of the latter, said stone removing unit consisting of parallel, oppositely rotating helices having their axis of rotation substantially parallel to the axes of the said elevators, and means drivingly interconnecting said first elevator, said second elevator, said conveyor, and said stone removing unit.

3. A potato harvester including a frame a digger carried by the said frame, an elevator supported on said frame rearwardly adjacent to said digger, a second elevator supported on said frame disposed generally parallel to but oppositely inclined to said first elevator, a transverse conveyor carried by said frame extending from the discharge end of said first elevator and delivering to the lower end of said second elevator, a separator carried by said frame interposed between the conveyor and said second elevator and overlying the lower end of the latter, and an endless belt clod crusher disposed above and in alignment with said first elevator, and means drivingly interconnecting said first elevator, said second elevator, said conveyor, said separator, and said clod crusher.

4. A potato harvester including a frame a digger carried by said frame, an elevator supported on said frame rearwardly adjacent to said digger, a second elevator supported on said frame disposed generally parallel to but oppositely inclined to said first elevator, a transverse conveyor carried by said frame extending from the discharge end of said first elevator and delivering to the lower end of said second elevator, a separator carried by said frame interposed between the conveyor and said second elevator and overlying the lower end of the latter, and an endless belt clod crusher disposed above and in alignment with said first elevator, said clod crusher travelling at a higher rate of speed than said first elevator, and means drivingly interconnecting said first elevator, said second elevator, said conveyor, said separator, and said clod crusher.

5. A potato harvester including a frame a digger carried by said frame, an elevator carried by the frame rearwardly adjacent to said digger, a second elevator carried by the frame disposed generally parallel to but oppositely inclined to said first elevator, a transverse conveyor supported on said frame extending from the discharge end of said first elevator, and delivering to the lower end of said second elevator, a separator carried by said frame interposed between the conveyor and said second elevator and overlying the lower end of the latter, an endless belt clod crusher disposed above and in alignment with said first elevator, means for varying the distance between the first elevator and the overlying clod crusher, and means drivingly interconnecting said first elevator, said second elevator, said conveyor, said separator, and said clod crusher.

CARL E. JOHNSON.

REFERENCES CITED

The following references are of record in the file of this patent:

UNITED STATES PATENTS

| Number | Name | Date |
|---|---|---|
| 616,885 | Brennan | Jan. 3, 1899 |
| 664,406 | Harms | Dec. 25, 1900 |
| 1,202,737 | Klitzke | Oct. 24, 1916 |
| 1,615,716 | Moon | Jan. 25, 1927 |
| 1,639,832 | Zuckerman | Aug. 23, 1927 |
| 1,641,492 | Jasperson | Sept. 6, 1927 |
| 1,685,230 | Giberson | Sept. 25, 1928 |
| 1,784,209 | Timm | Dec. 9, 1930 |
| 2,015,549 | Dwyer | Sept. 24, 1935 |
| 2,095,428 | Batie | Oct. 12, 1937 |
| 2,209,282 | Rodin | July 23, 1940 |
| 2,365,077 | Hertzler | Dec. 12, 1944 |

FOREIGN PATENTS

| Number | Country | Date |
|---|---|---|
| 39,493 | Germany | June 3, 1887 |
| 6,919 | Great Britain | of 1902 |